United States Patent
Tian et al.

(10) Patent No.: US 11,632,444 B2
(45) Date of Patent: Apr. 18, 2023

(54) METHOD, DEVICE, AND SYSTEM FOR TCP PACKET TRANSMISSION OVER SATELLITE COMMUNICATION NETWORK

(71) Applicant: INTELLIGENT FUSION TECHNOLOGY, INC., Germantown, MD (US)

(72) Inventors: Xin Tian, Germantown, MD (US); Qi Zhao, Germantown, MD (US); Yi Li, Germantown, MD (US); Genshe Chen, Germantown, MD (US); Khanh Pham, Kirtland, NM (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 0 days.

(21) Appl. No.: 17/021,674

(22) Filed: Sep. 15, 2020

(65) Prior Publication Data
US 2022/0086261 A1   Mar. 17, 2022

(51) Int. Cl.
*H04L 43/0829* (2022.01)
*H04L 69/163* (2022.01)
*H04L 1/18* (2023.01)
*H04L 47/193* (2022.01)

(52) U.S. Cl.
CPC .............. *H04L 69/163* (2013.01); *H04L 1/18* (2013.01); *H04L 43/0829* (2013.01); *H04L 47/193* (2013.01)

(58) Field of Classification Search
CPC ..... H04L 1/1607; H04L 1/18; H04L 43/0829; H04L 47/193; H04L 65/80; H04L 69/161; H04L 69/163; H04L 47/10
USPC ................................ 370/229, 231, 352, 235
See application file for complete search history.

(56) References Cited

U.S. PATENT DOCUMENTS

| | | | | |
|---|---|---|---|---|
| 2005/0232154 A1* | 10/2005 | Bang | ....................... | H04L 47/10 370/235 |
| 2008/0037420 A1* | 2/2008 | Tang | ..................... | H04L 1/1607 370/229 |
| 2011/0103377 A1* | 5/2011 | Hua | ........................ | H04L 65/80 370/352 |

(Continued)

*Primary Examiner* — Harun Chowdhury
(74) *Attorney, Agent, or Firm* — Anova Law Group, PLLC

(57) ABSTRACT

Various embodiments provide a method for transmission control protocol (TCP) packet transmission. The method includes receiving, by a receiver performance enhancing node (PEN), one or more TCP packets each with a timestamp and a sequence number from a sender PEN; evaluating a packet delivery time from the sender PEN to the receiver PEN; detecting whether any TCP packet is lost based on a packet sequence and determining a delay shaping time for each TCP packet based on a maximum number of retransmissions and an evaluated delivery time distribution; in response to a lost TCP packet being detected, determining whether the lost TCP packet needs to be retransmitted based on the maximum number of retransmissions; and in response to the determined delay shaping time, determining when a received TCP packet needs to be forwarded based on the determined delay shaping time and a timestamp associated with the received TCP packet.

16 Claims, 4 Drawing Sheets

(56) References Cited

U.S. PATENT DOCUMENTS

2013/0166982 A1* 6/2013 Zheng ................ H04L 1/18
  714/748
2015/0006749 A1* 1/2015 Hendel ................ H04L 47/34
  709/230

* cited by examiner

US 11,632,444 B2

METHOD, DEVICE, AND SYSTEM FOR TCP PACKET TRANSMISSION OVER SATELLITE COMMUNICATION NETWORK

GOVERNMENT RIGHTS

The present disclosure was made with Government support under Contract No. FA9453-19-P-0551, awarded by the United States Air Force Research Laboratory. The U.S. Government has certain rights in the present disclosure.

FIELD OF THE DISCLOSURE

The present disclosure generally relates to the field of communication network technology and, more particularly, relates to a method, a device, and a system for TCP packet transmission over a satellite communication (SATCOM) network.

BACKGROUND

Currently, satellite communication (SATCOM) plays a more important role in both civilian and tactical scenarios. SATCOM can provide a large signal coverage with fewer assets and easily bypass terrestrial communication infrastructure if needed, and also becomes one of the key facilitators of the Global Information Grid (GIG). Nevertheless, SATCOM communication has its own shortages, such as long propagation distance and delay, and potential high packet error rate of the SATCOM in higher earth orbits satellites, which may lead to severe communication performance degradation. The performance of applications using transmission control protocol (TCP), a connection-oriented transportation layer protocol, over SATCOM may be impaired as well by large network delay and high packet loss rate. Therefore, it is essential to develop a packet transmission solution to enhance the performance of the end-to-end TCP packet transmission over a satellite communication (SATCOM) network with large delay and high packet loss rate.

BRIEF SUMMARY OF THE DISCLOSURE

One aspect or embodiment of the present disclosure provides a method for transmission control protocol (TCP) packet transmission over a network segment with high packet loss rate. The method includes receiving, by a receiver performance enhancing node (PEN), one or more TCP packets each with a timestamp and a sequence number from a sender PEN; evaluating a packet delivery time from the sender PEN to the receiver PEN based on the timestamp associated with each TCP packet; performing one or more of: detecting whether any TCP packet is lost based on a packet sequence and determining a delay shaping time for each TCP packet based on a maximum number of retransmissions and an evaluated delivery time distribution; in response to a lost TCP packet being detected, determining whether the lost TCP packet needs to be retransmitted based on the maximum number of retransmissions; and in response to the determined delay shaping time, determining when a received TCP packet needs to be forwarded based on the determined delay shaping time and a timestamp associated with the received TCP packet.

Optionally, when it is determined that the lost TCP packet needs to be retransmitted, the method further includes sending a packet retransmission request for the lost TCP packet with a packet sequence number to the sender PEN.

Optionally, when the time for forwarding the received TCP packet is determined, the method further includes forwarding the received TCP packet, by the receiver PEN, at the time for forwarding the received TCP packet.

Optionally, before receiving the one or more TCP packets, the method further includes receiving the one or more TCP packets, by the sender PEN, from a TCP sender; associating the timestamp with each TCP packet, and associating the sequence number with each TCP packet; and sending each TCP packet with the timestamp and the sequence number, by the sender PEN, to the receiver PEN.

Optionally, after sending the packet retransmission request, the method further includes receiving the packet retransmission request for the lost TCP packet, by the sender PEN, from the receiver PEN; and retransmitting the lost TCP packet with a corresponding timestamp and a corresponding sequence number.

Optionally, a communication network includes a plurality of network segments including a first network segment, a second network segment, and a third network segment.

Optionally, the sender PEN and the receiver PEN are deployed at two sides of the second network segment.

Optionally, performing one or more of: detecting whether any TCP packet is lost based on a packet sequence and determining a delay shaping time for each TCP packet based on a maximum number of retransmissions and an evaluated delivery time distribution includes performing a packet retransmission in a user datagram protocol (UDP) tunnel; and performing a packet delay shaping by the receiver PEN.

Optionally, performing the packet delay shaping includes a packet travel time calculation and a packet delay sending; and performing the packet retransmission includes using a retransmission thread and acknowledgement buffers.

Optionally, the maximum number of retransmissions is determined based on a corresponding packet loss rate and a target (desired) packet loss rate.

Another aspect or embodiment of the present disclosure provides a device for transmission control protocol (TCP) packet transmission. The device includes a memory, containing a computer program stored thereon; and a processor, coupled with the memory and configured, when the computer program being executed, to perform a method including: receiving, by a receiver performance enhancing node (PEN), one or more TCP packets each with a timestamp and a sequence number from a sender PEN; evaluating a packet delivery time from the sender PEN to the receiver PEN based on the timestamp associated with each TCP packet; performing one or more of: detecting whether any TCP packet is lost based on a packet sequence and determining a delay shaping time for each TCP packet based on a maximum number of retransmissions and an evaluated delivery time distribution; in response to a lost TCP packet being detected, determining whether the lost TCP packet needs to be retransmitted based on the maximum number of retransmissions; and in response to the determined delay shaping time, determining when a received TCP packet needs to be forwarded based on the determined delay shaping time and a timestamp associated with the received TCP packet.

Another aspect or embodiment of the present disclosure provides a system for transmission control protocol (TCP) packet transmission, comprising a TCP packet transmission device including any one of the above-mentioned devices, and a sender performance enhancing node (PEN) and a receiver PEN over a communication network.

Optionally, the system further includes a TCP sender and a TCP receiver, where the TCP sender is configured to send out the one or more TCP packets, wherein the one or more TCP packets reach a second network segment and the one or more TCP packets are handled by the sender PEN, and the TCP receiver is configured to receive the retransmitted TCP packet and/or the forwarded TCP packet from the receiver PEN.

Optionally, the communication network includes a plurality of network segments including a first network segment, a second network segment, and a third network segment.

Optionally, the sender PEN and the receiver PEN are deployed at two sides of the second network segment.

Optionally, the system further includes a user datagram protocol (UDP) tunnel for performing a packet retransmission when it is detected the TCP packet is lost; and performing a packet delay shaping by the receiver PEN.

Optionally, the maximum number of retransmissions is determined based on a corresponding packet loss rate and a target (desired) packet loss rate.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Various embodiments provide a method, a device, and a system for TCP packet transmission over a satellite communication (SATCOM) network or any type of networks with large delay and high packet loss rate for performance enhancement. A conventional way to improve end-to-end TCP performance over network with large delay and high packet loss rate is the TCP split technology, where a plurality of PENs may be deployed over the (SATCOM) network. The first PEN pretends to be the TCP receiver for the original TCP sender. Then, the second PEN pretends to be the TCP receiver for the first PEN, and the same behavior may be kept for all PENs until hitting the original TCP receiver. The whole TCP link may be divided into several sequentially connected sub-TCP link segments. For each sub-TCP segment, significantly smaller propagation delay may be presented to the TCP senders and receivers, such that the whole SATCOM link may work in a high throughput and low latency state. However, the TCP split technology requires the PENs to be able to access the TCP headers of the TCP packets so that the original TCP sequence number can be accessed. This requirement cannot be met when the TCP packet is encrypted. As a result, the TCP split technology cannot be used over encrypted networks.

The present disclosure presents a solution for enhancing end-to-end TCP performance over a network with large delay and high packet loss rate. The proposed solution does not require the header information of the original TCP packets. As a result, it is able to operate over encrypted networks to improve end-to-end TCP performance.

Figure 1:
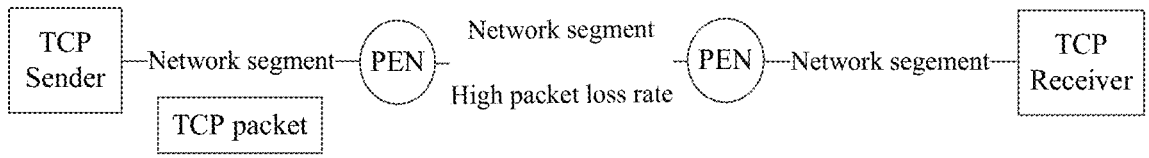
FIG. 1 depicts a block diagram illustrating an exemplary SATCOM communication system according to various disclosed embodiments.

FIG. 1 depicts a block diagram illustrating an exemplary SATCOM system according to various disclosed embodiments. Referring to FIG. 1, the disclosed communication system may include a transmission control protocol (TCP) sender, a TCP receiver, and two performance enhancing nodes (PENs) including a sender PEN and a receiver PEN. The communication system may further include a network which are divided into a plurality of network segments including a first network segment, a second network segment, and a third network segment, which may enhance the performance of the end-to-end TCP communication. The first network segment is the network between the TCP sender and a first (sender) PEN. The second network segment is the network between the first (sender) PEN and a second (receiver) PEN. The third network segment is the network between the second (receiver) PEN and the TCP receiver. The second network segment may be a SATCOM link/network with high packet loss rate. The two PENs may be deployed at two sides of the second network segment, which improves the performance of end-to-end TCP via disclosed mechanisms including limited packet retransmission, and delay shaping.

In one embodiment, two PENs may be deployed at both ends of the second network segment, e.g., a SATCOM link/network.

Transport layer data tunnels between the sender PEN and the receiver PEN over the second (e.g., satellite) network segment may comprise two common types of network tunneling, including a TCP tunnel and a UDP tunnel. The TCP tunnel is a technology that may aggregate and transfer packets which are transmitted between end hosts as a single TCP connection, while the UDP tunnel is essentially same except for using the UDP connection instead of TCP connection for the tunnel. The TCP tunnel is widely used for network tunneling because it works on the TCP protocol to provide a reliable transmission with guaranteed packet arrival from one side of the tunnel to the other side. Since the end-to-end communication uses TCP protocol at the transportation layer, a well-known problem called TCP meltdown problem may occur, which can degrade the end-to-end TCP throughput severely due to the interference of two TCP congestion control algorithms operated simultaneously at both end-to-end communication and tunnel communication. TCP divides the data stream into segments and uses a sequence number and an acknowledgement number to tell the other peer its own data receiving status. Since parameters, such as bandwidth, latency and loss rate, are vastly different from one connection to another and even changing over time, a fixed timeout in the seconds range would be inappropriate on a fast LAN and likewise inappropriate on a congested link. Therefore, adaptive timeouts are introduced for all timing-related parameters. If there is a segment retransmission happened in tunnel, the timeout of the end-to-end TCP may be significantly small since all packets are delivered in time before such retransmission. Then, a significantly large delivery time may be seen since the retransmission, which is highly possible to exceed the small timeout value and lead to a timeout. In such way, it may cause the end-to-end TCP to "recover" from slow start and degrading the average throughput of the end-to-end TCP. TCP meltdown problem has been extensively studied and investigated for a lengthy time. Nevertheless, a simple, practical and effective solution for solving TCP meltdown problem in TCP-over-TCP scenario has not been emerged yet to completely eliminate the performance issues of the TCP meltdown problem.

It should be understood that when the TCP tunnel is used for sending data (original TCP packet) from the sender PEN to the receiver PEN over the second network segment, the perceived packet loss rate of the second network segment is zero regardless of the original loss rate of the second network segment, which is because the TCP tunnel uses packet retransmission to guarantee that all data packets are delivered to the receiver PEN.

Another network tunnel may use UDP at the transportation layer. UDP sends messages which are called datagrams and is considered a best-effort mode of communications. The main difference between TCP and UDP is that TCP is reliable as it guarantees delivery of data to the destination router while the delivery of data to the destination cannot be guaranteed in UDP. Moreover, TCP offers extensive error checking mechanisms because it provides flow control and acknowledgment of data, and UDP has only a single error checking mechanism which is used for checksums. Therefore, creating the UDP tunnel for the end-to-end TCP communication may not introduce the TCP-over-TCP scenario as well as the TCP meltdown problem. However, in a high assurance internet protocol encryption (HAIPE) and PEN coexisted scenario, the UDP tunnel may leave the SATCOM link as a high loss rate and propagation delay link to the end-to-end TCP communication. Such link quality may severely affect the performance of the end-to-end TCP communication. The link loss rate may have higher impact on the average throughput than the link propagation delay. Thus, the UDP tunnel may be enhanced to improve the tunnel link with respect of the link loss rate to ensure the end-to-end TCP communication performance.

It should be understood that the original UDP tunnel does not have the packet retransmission feature on its own, which may not help improving the packet loss rate of the second network segment.

The use of the TCP data tunnel and the UDP data tunnel may represent two extreme cases of using packet retransmission to reduce the packet loss rate. With the TCP data tunnel, an unlimited number of retransmissions may be used to guarantee zero packet loss rate. However, with the UDP data tunnel, no packet retransmission is used, which may lead to no improvement in the packet loss rate of the network segment between the sender PEN and the receiver PEN. On the other hand, the TCP data tunnel may introduce large variations in packet delivery times due to packet retransmission, which negatively impacts data tunnel performance in transmitting TCP data traffic.

For the TCP tunnel, the TCP meltdown problem has been previously discussed, such that the packet delay shaping mechanism at the receiver PEN is introduced to improve the average throughput.

With the UDP tunnel, in order to effectively reduce the packet loss rate of the network segment, UDP tunnel with a limited number of packet retransmissions may be used between the sender and receiver PEN nodes. In order to reduce the packet delivery time variation, the delay shaping at the receiver PEN may be used. It is shown that the UDP tunnel with the limited number of packet retransmissions and the delay shaping technique (at the receiver PEN) jointly are able to achieve the best end-to-end TCP performance enhancement.

For the UDP tunnel, the high link/network loss rate (between the two PENs) impacts the end-to-end TCP throughput performance, such that the UDP packet retransmission mechanism is introduced to fix the packet loss in the original UDP tunnel. However, only a limited number of retransmissions may be used, which is different from the TCP tunnel.

Figure 2:
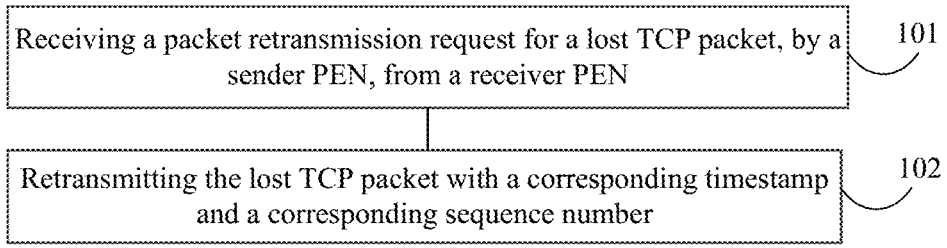
FIG. 2 depicts a flow diagram illustrating an exemplary packet retransmission according to various disclosed embodiments.

FIG. 2 depicts a flow diagram illustrating an exemplary packet retransmission by the sender PEN according to various disclosed embodiments. Referring to FIG. 2, the packet retransmission may be described hereinafter.

In step 101, a packet retransmission request for a lost TCP packet may be received, by the sender PEN, from the receiver PEN.

In step 102, the lost TCP packet with a corresponding timestamp and a corresponding sequence number may be retransmitted.

Figure 3:
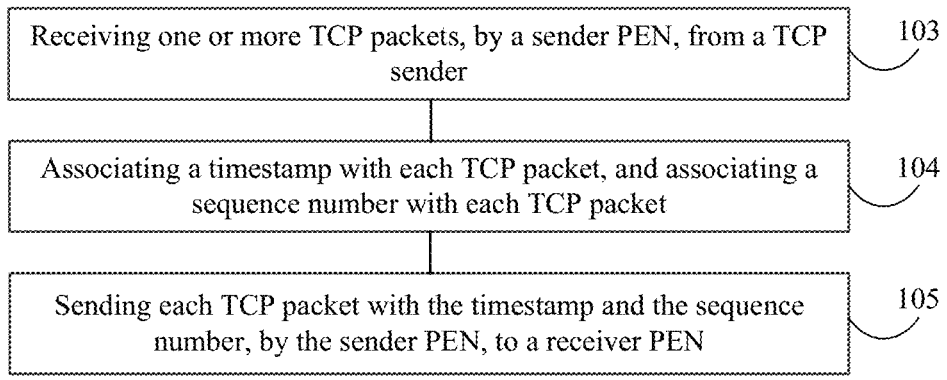
FIG. 3 depicts a flow diagram illustrating an exemplary packet forwarding according to various disclosed embodiments.

FIG. 3 depicts a flow diagram illustrating an exemplary packet forwarding from the sender PEN to the receiver PEN according to various disclosed embodiments. Referring to FIG. 3, the packet forwarding may be described hereinafter.

In step 103, one or more TCP packets may be received by the sender PEN from the TCP sender.

In step 104, a timestamp may be associated with each TCP packet, and a sequence number may also be associated with each TCP packet. It should be noted that the sequence number is not the original sequence number in the TCP packet header. The proposed method and system for end-to-end TCP performance enhancement does not use the header information of the TCP packet, such that the proposed method and system can be used over encrypted networks.

In step 105, each TCP packet along with the timestamp and the sequence number may be sent, by the sender PEN, to the receiver PEN.

Figure 4:
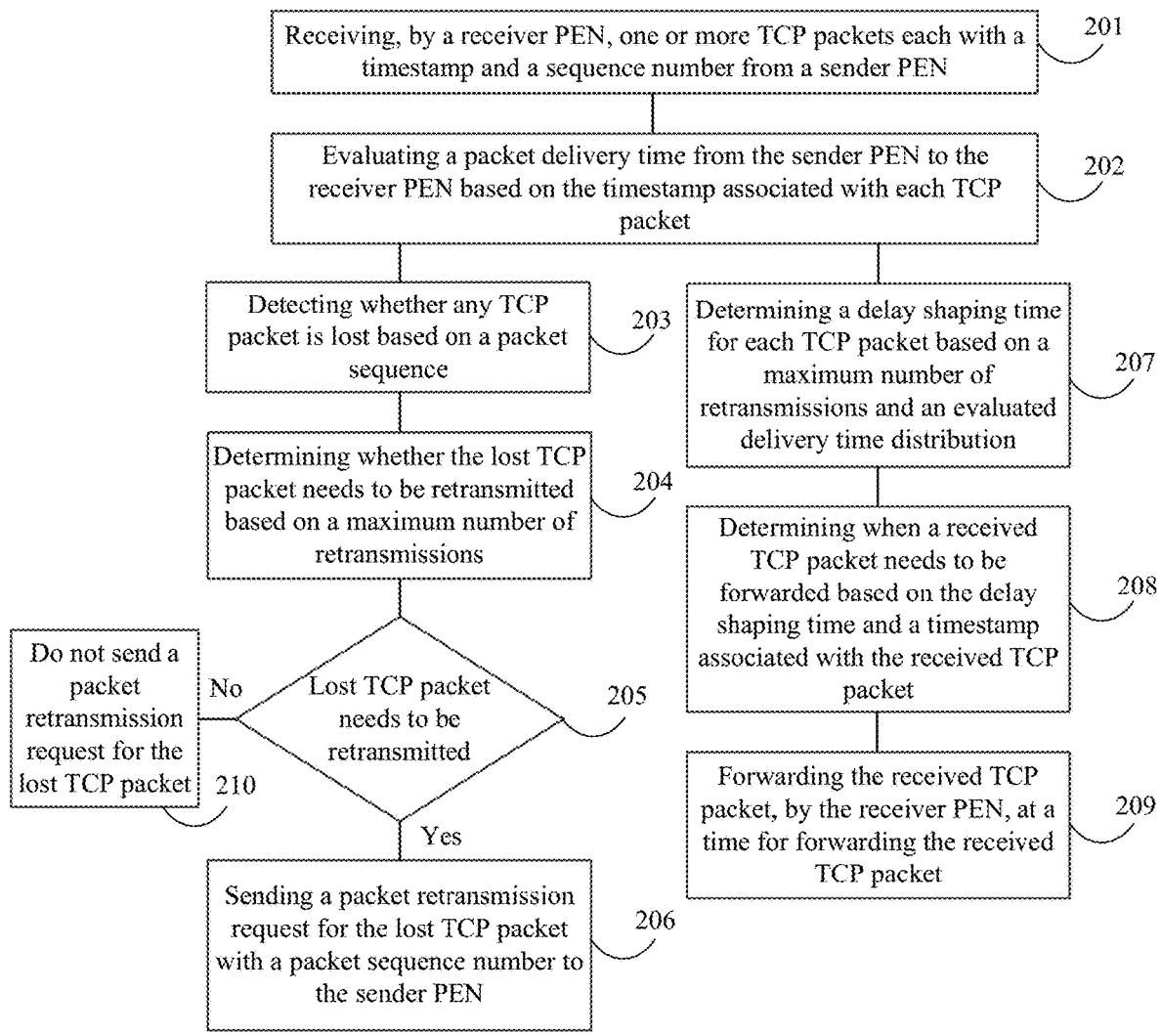
FIG. 4 depicts a block diagram illustrating an exemplary method including packet retransmission and packet delay shaping according to various disclosed embodiments.

FIG. 4 depicts a block diagram illustrating an exemplary method including packet retransmission and packet delay shaping according to various disclosed embodiments. Referring to FIG. 4, the method including packet retransmission and packet delay shaping may be described hereinafter.

In step 201, one or more TCP packets each with a timestamp and a sequence number may be received, by the receiver PEN, from the sender PEN (e.g., a previous PEN).

In step 202, when a TCP packet is received at the receiver PEN, the packet delivery time from the sender PEN to the receiver PEN may be evaluated based on the timestamp associated with the TCP packet. The packet delivery time may be evaluated by generating a timestamp on delivery and computed by subtracting the timestamp associated with the TCP packet from the delivery timestamp.

Figure 5:
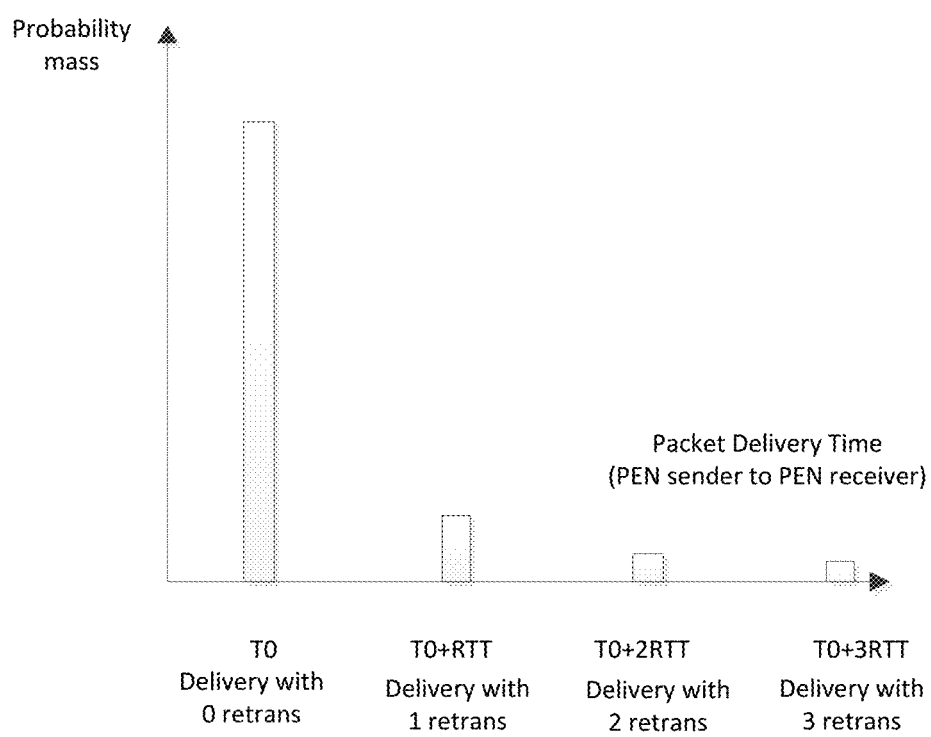
FIG. 5 illustrates a distribution of evaluated packet delivery time according to various disclosed embodiments.

FIG. 5 illustrates the distribution of evaluated packet delivery time according to various disclosed embodiments. The first (left) probability mass bar corresponds to packets that are delivered with single time transmission (TO). For example, for a link with packet loss rate of 0.001, the probability mass for the first bar may be about 0.999. The second probability mass bar corresponds to packets that are delivered with 1 retransmission. Delivery time difference between the second bar and the first bar may be about a round trip time (RTT) between the two PEN nodes (e.g., the sender PEN and the receiver PEN). The third and fourth probability mass bars correspond to packets delivered with 2 and 3 retransmissions and having additional 2 and 3 RTT plus TO, respectively.

In step 203, whether any TCP packet is lost may be detected based on a packet sequence. If a TCP packet, which has a sequence number later than a TCP packet that is not yet received, is received, the still missing TCP packet may be detected as lost. In one embodiment, missing packet sequence numbers and packet losses may be detected based on received packet sequence numbers.

In step 204, in response to a lost TCP packet being detected, whether the lost TCP packet needs to be retransmitted may be determined according to the maximum number of retransmissions. For a link with a high packet loss rate, the packet retransmission may effectively reduce perceived link loss rate. For example, for a link with $10^{-3}$ loss rate, 1 retransmission may reduce the perceived packet loss rate to $10^{-6}$. The maximum number of retransmissions may be determined based on a target (perceived) packet loss rate and the original packet loss rate between the sender PEP and the receiver PEP. Using the maximum number of retransmissions and the packet delay distribution between the sender PEN and the receiver PEN, a delay shaping time may be determined (e.g., in steps 203-204 and/or 207). The delay shaping time may determine the time difference between the time when the TCP packet needs to be forwarded by the receiver PEN and the time when the TCP packet is sent by the sender PEN to the receiver PEN. As a result, the time when the TCP packet needs to be forwarded by the receiver PEN to a next network hop may be obtained as the TCP packet time stamp plus the delay shaping time.

In step 204, a missing TCP packet's expected forwarding time by the receiver PEN can be estimated by the expected forwarding time of delivered TCP packets with neighboring sequence numbers. If the difference between the expected forwarding time and the current time at the receiver PEN is smaller than the RTT between the sender PEN and the receiver PEN, no retransmission request should be sent to the sender PEN for the missing TCP packet. If the difference between the expected forwarding time of the missing TCP packet and the current time at the receiver PEN is larger than the RTT, a retransmission request should be sent to the sender PEN in case of that a previous retransmission request has passed for more than a RTT and the TCP packet is still missing. The RTT between the sender PEN and the receiver PEN may be evaluated based on the packet delay distribution as illustrated in FIG. 5.

In step 205, if the lost packet needs to be retransmitted, step 206 may then be proceeded; and if the lost packet does not need to be retransmitted, step 210 may be proceeded. In step 206, when it is determined that the lost TCP packet needs to be retransmitted, the packet retransmission request for the lost TCP packet with a packet sequence number may be sent to the sender PEN. Then, the steps 101-102 may be proceeded to implement the packet retransmission process according to various embodiments of the present disclosure. In step 210, when it is determined that the lost TCP packet does not need to be retransmitted, the packet retransmission request may not be sent.

For implementation of the packet retransmission, the TCP packet that needs to be forwarded to the other side of the tunnel may also be tracked. A corresponding acknowledgement (ACK) may be used to verify the arrival of the TCP packet. If ACK is missing for a certain time period, it's assumed that TCP packet may be lost during last transmission and the retransmission may be initiated immediately.

Two features including retransmission thread and acknowledgement buffers may be developed to support the packet retransmission. Retransmission thread is described hereinafter in detail according to the embodiments of the present disclosure. To implement the packet retransmission, the key part is to verify whether the TCP packet arrives the other side of the UDP tunnel successfully. Therefore, multi-threading may be configured to hold every sent TCP packet while waiting the ACK from the other side of the UDP tunnel. A Linux POSIX thread (e.g., pthread) may be alive for slightly more than RTT. After that time period, the received ACK buffer may be checked to confirm whether the ACK has arrived. If the corresponding ACK is found, the pthread may be destroyed immediately, and the corresponding resources may be released as well. If the corresponding ACK is not found, the TCP packet may be resent, and the pthread may be destroyed afterwards. In one embodiment of the present disclosure, one-time retransmission may only be considered to simplify the packet processing in the packet forwarder to avoid performance reduction.

Acknowledgement buffers, including a received ACK buffer and an ACK ID buffer, are described hereinafter in detail according to the embodiments of the present disclosure. The received ACK buffer may be configured to keep tracking whether an outgoing packet is received or not at the other side of the UDP tunnel. The ACK ID buffer may be configured to keep tracking of received packet IDs. The received packet IDs may be sent back to acknowledge the other side of the UDP tunnel periodically. In one embodiment, three ACK ID buffers with 500 packet IDs capacity each may be created. One ACK ID buffer may be configured to save a new incoming packet ID at a time and the other two ACK ID buffers may be configured for duplication. When sending the ACKs back every time, the ACKs in three ACK ID buffers may all be sent out to ensure that the ACKs can arrive the other side of the UDP tunnel even if there is packet loss.

The delay shaping process by the receiver PEN is described as follows. In step 207, based on the maximum number of retransmissions and the evaluated delivery time distribution, the delay shaping time may be determined as previously described. With the delay shaping, all TCP packets may spend a similar amount of time (e.g., the delay shaping time) in the network segment between the sender PEN and the receiver PEN regardless of the number of retransmissions that are used to send the TCP packets from the sender PEN to the receiver PEN.

In step 208, the time when a received TCP packet needs to be forwarded to a next network hop by the receiver PEN may be evaluated using the delay shaping time and the timestamp of the TCP packet which is added by the sender PEN.

In step 209, the forwarding of the received TCP packet by the receiver PEN may be scheduled at the forwarding time obtained in step 208. The received TCP packet may be forwarded when the forwarding time is due.

For implementation, two features including packet travel time and packet delay sending may be needed to support the packet delay shaping. Packet travel time calculation is described hereinafter in detail according to the embodiments of the present disclosure. To add the extra delay time to each TCP packet, it is needed to know the exact traveling time through the TCP tunnel for each TCP packet. Since the single-way propagation time of the TCP packet on bidirectional tunnel is needed, the echo used by TCP to calculate the RTT may not be suitable for such task and the time measurement may be completed manually. The kernel time as sending time at the forwarder right before sending into the TCP tunnel may be captured. That timestamp may be encapsulated in the TCP packet by occupying 16 bytes. At the other side of the TCP tunnel, the forwarder may extract the timestamp from the TCP packet and then calculate the travel time based on the time when such TCP packet is received.

Packet delay sending is described hereinafter in detail according to the embodiments of the present disclosure. Once the packet travel time is obtained, multi-threading may be configured to implement the packet delay sending. Since the emulation testbed is implemented in Linux system, the light-weight Linux POSIX thread (e.g., pthread) is used. Whenever the tunnel receives a TCP packet, da pthread may be created to hold the TCP packet, and the delay time may be calculated based on the packet travel time calculation. Then, a delay timer may be set accordingly; and once the time is up, the TCP packet may be forwarded to its destination and the pthread itself may be destroyed along with its occupied resources.

It should be understood that the delay shaping at the receiver PEN can be used as long as the sender PEN attaches a timestamp to the TCP packet sent through the data tunnel (between the sender PEN and the receiver PEN). The data tunnel may be the TCP data tunnel, the UDP data tunnel, or the UDP tunnel with limited retransmissions and the like, which may not be limited according to various embodiments of the present disclosure.

Figure 6:
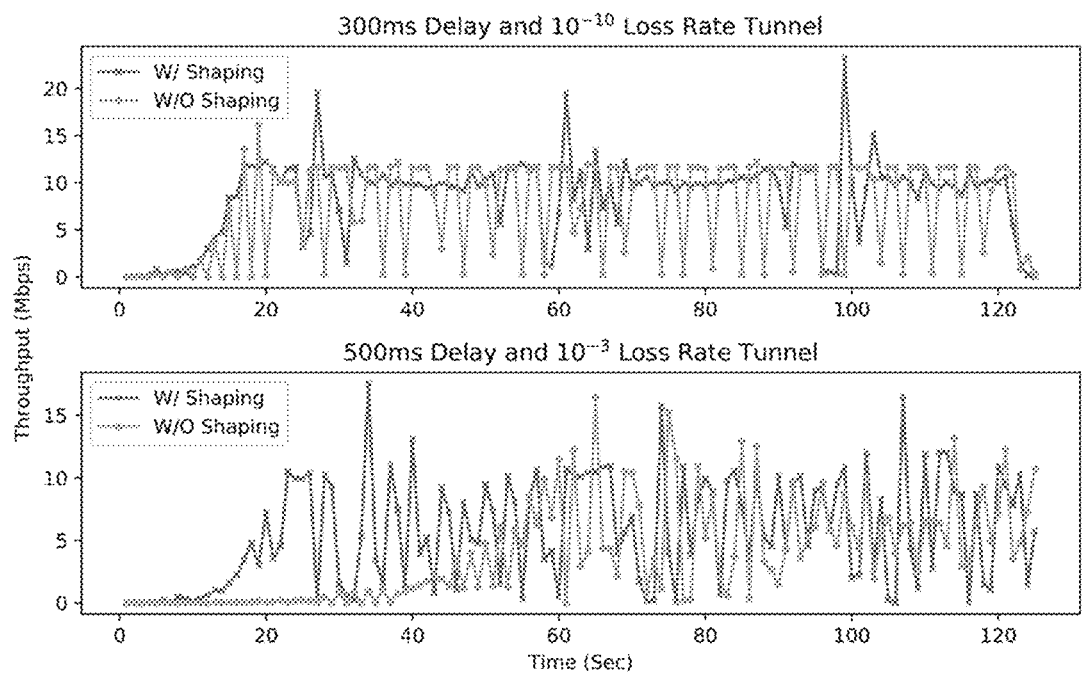
FIG. 6 illustrates an exemplary TCP channel with packet delay shaping at a receiver PEN according to various disclosed embodiments.

FIG. 6 illustrates an exemplary TCP channel with the packet delay shaping at the receiver PEN according to various disclosed embodiments. The upper graph in FIG. 6 shows the results for the TCP tunnel link configured with 10 Mbps throughput, 300 ms propagation delay and $10^{-10}$ loss rate. It can be seen that the average throughput for the TCP tunnel without the packet delay shaping is approximately 7.26 Mbps while the TCP tunnel with the packet delay shaping is approximately 8.27 Mbps which has 13.9% performance gain. The TCP tunnel with the packet delay shaping has much less throughput fluctuation than the TCP tunnel without the packet delay shaping, which may benefit from the significantly smaller delay variation. The lower graph in FIG. 6 shows almost the same behavior when the tunnel link quality is low, where the TCP tunnel link is configured with 500 ms delay and $10^{-3}$ loss rate respectively. Higher improvement of the average throughput because of the packet delay shaping may be identified. For example, the case without the packet delay shaping has about 4.69 Mbps average throughput, and the case with the packet delay shaping one is about 5.49 Mbps which has 17.0% performance gain. It should be noted that the achieved throughput with the TCP tunnel may be only about 55% of the physical link throughput (i.e., 10 Mbps). The results demonstrate that even with the TCP tunnel (unlimited retransmission), the use of the delay shaping at the receiver PEN may effectively reduce the packet delivery time variation and improve the end-to-end TCP throughput.

Figure 7:
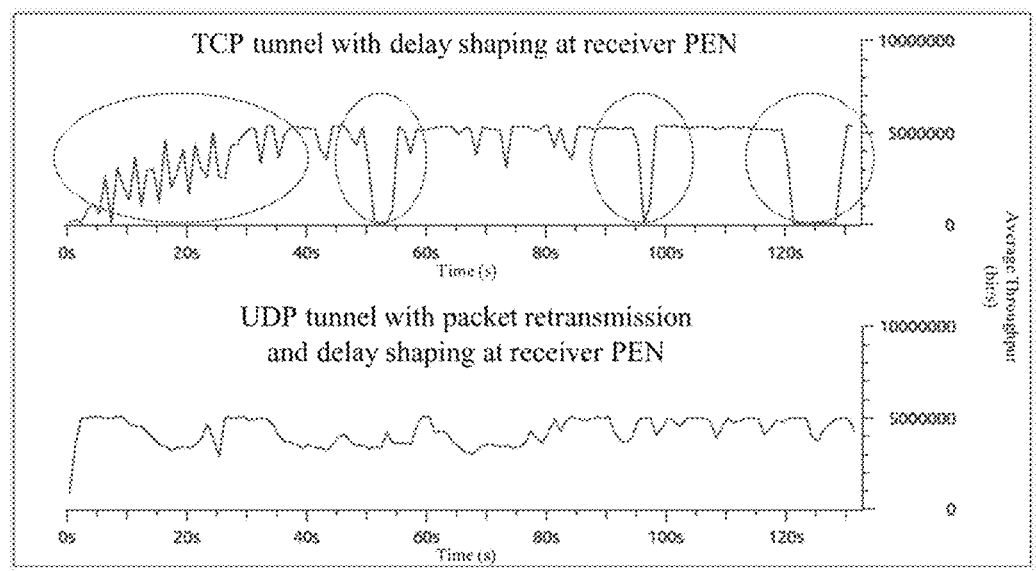
FIG. 7 illustrates an exemplary UDP channel with limited packet retransmission and delay shaping at a receiver PEN according to various disclosed embodiments.

FIG. 7 illustrates an exemplary UDP channel with limited packet retransmission and the delay shaping at the receiver PEN according to various disclosed embodiments. The performance of the end-to-end TCP communication with PENs using the UDP tunnel with limited packet retransmission mechanism and the delay shaping is evaluated. The link is configured with 5 Mbps bandwidth, 300 ms propagation delay, and $10^{-3}$ loss rate. The maximum number of retransmissions for the UDP tunnel used in such scenario is 1, which may not be limited according to various embodiments of the present. Referring to FIG. 7, the UDP tunnel with limited packet retransmission and the delay shaping by the receiver PEN may have improved performance. Compared with the TCP tunnel with the delay shaping, the UDP tunnel with limited packet retransmission and the delay shaping may take less time to converge to the highest throughput. Moreover, as the circles showed in FIG. 7, multiple throughput drops can be observed in the TCP tunnel with the delay shaping while the UDP tunnel with the limited packet retransmission and the delay shaping has significantly stable throughput for the entire process. Furthermore, the average throughput for the TCP tunnel with the delay shaping is 3.25 Mbps, and the average throughput for the UDP tunnel with limited packet retransmission and the delay shaping is 4.40 Mbps which gains significant (35.4%) throughput improvement. The 4.40 Mbps throughput is about 88% of the throughput of the physical link (i.e., 5 Mbps). In comparison, the TCP tunnel with the delay shaping can only achieve the end-to-end throughput that is about 60% of the physical link throughput.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. In certain cases, the numerical values as stated for the parameter can take on negative values.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for a transmission control protocol (TCP) packet transmission, comprising:
   receiving, by a receiver performance enhancing node (PEN), one or more TCP packets each with a timestamp and a sequence number from a sender PEN;
   determining a delay shaping time for all of the one or more TCP packets; and
   with the determined delay shaping time, determining a time when a received TCP packet needs to be forwarded based on the delay shaping time and the timestamp associated with the received TCP packet, and forwarding the received TCP packet at the time when the received TCP packet needs to be forwarded,
   wherein the delay shaping time for the one or more TCP packets is determined based on the that is needed for a packet to be delivered from the sender PEN to the receiver PEN with a maximum number of retransmissions.

2. The method according to claim 1, further comprising:
   determining whether a lost TCP packet needs to be retransmitted based on the maximum number of retransmissions; and
   sending a packet retransmission request for the lost TCP packet with a packet sequence number to the sender PEN.

3. The method according to claim 1, wherein before receiving the one or more TCP packets, the method further includes:
   receiving the one or more TCP packets, by the sender PEN, from a TCP sender;
   associating the timestamp with each TCP packet, and associating the sequence number with each TCP packet; and
   sending each TCP packet with the timestamp and the sequence number, by the sender PEN, to the receiver PEN.

4. The method according to claim 2, wherein after sending the packet retransmission request, the method further includes:
   receiving the packet retransmission request for the lost TCP packet, by the sender PEN, from the receiver PEN; and
   retransmitting the lost TCP packet with a corresponding timestamp and a corresponding sequence number.

5. The method according to claim 1, wherein:
   a communication network includes a plurality of network segments including a first network segment, a second network segment, and a third network segment.

6. The method according to claim 5, wherein:
   the sender PEN and the receiver PEN are deployed at two sides of the second network segment.

7. The method according to claim 1, wherein:
   performing the packet delay shaping includes a packet travel time calculation and a packet delay sending; and
   performing the packet retransmission includes using a retransmission thread and acknowledgement buffers.

8. The method according to claim 1, wherein:
   the maximum number of retransmissions is determined based on a corresponding packet loss rate from the sender PEN to the receiver PEN and a target packet loss rate.

9. The method according to claim 1, further comprising:
   detecting whether any TCP packet is lost based on packet sequence numbers and in response to a lost TCP packet being detected, determining whether the lost TCP packet needs to be retransmitted based on the maximum number of retransmissions.

10. The method according to claim 1, further comprising:
    evaluating a packet delivery time from the sender PEN to the receiver PEN based on the timestamp associated with the TCP packet and its arrival time at the receiver PEN, and determining the time that is needed to finish the maximum number of retransmissions from the sender PEN to the receiver PEN based on evaluated packet delivery times.

11. A device for transmission control protocol (TCP) packet transmission, comprising:
    a memory, containing a computer program stored thereon; and
    a processor, coupled with the memory and configured, when the computer program being executed, to perform a method including:
      receiving, by a receiver performance enhancing node (PEN), one or more TCP packets each with a timestamp and a sequence number from a sender PEN;
      determining a delay shaping time for all of the one and more TCP packets; and
    with the determined delay shaping time, determining a time when a received TCP packet needs to be forwarded based on the delay shaping time and the timestamp associated with the received TCP packet, and forwarding the received TCP packet at the time when the received TCP packet needs to be forwarded,
    wherein the delay shaping time for the one or more TP packets is determined based on the time that is needed for a packet to be delivered from the sender PEN to the receiver PEN with a maximum number of retransmissions.

12. A system for transmission control protocol (TCP) packet transmission, comprising:
    a TCP packet transmission device including the device according to claim 11, and
    the sender performance enhancing node (PEN) and the receiver PEN, over a communication network.

13. The system according to claim 12, further including:
    a TCP sender and a TCP receiver, wherein:
    the TCP sender is configured to send out one or more TCP packets, wherein the one or more TCP packets reach a second network segment and the one or more TCP packets are handled by the sender PEN, and
    the TCP receiver is configured to receive a retransmitted TCP packet and/or a forwarded TCP packet from the receiver PEN.

14. The system according to claim 12, wherein:
    the communication network includes a plurality of network segments including a first network segment, a second network segment, and a third network segment.

15. The system according to claim 14, wherein:
    the sender PEN and the receiver PEN are deployed at two sides of the second network segment.

16. The system according to claim 12, wherein:
    the maximum number of retransmissions is determined based on a corresponding packet loss rate from the sender PEN to the receiver PEN and a target packet loss rate.

* * * * *